(12) United States Patent  
Wagner et al.

(10) Patent No.: US 10,764,720 B2  
(45) Date of Patent: *Sep. 1, 2020

(54) LOCATION DETERMINATION USING DEVICE COORDINATION

(71) Applicant: International Business Machines Corporation, Armonk, NY (US)

(72) Inventors: John M. Wagner, Carlton (AU); Fatemeh Jalali, Hawthorn East (AU); Mahtab Mirmomeni, Hawthorn East (AU); Shaila Pervin, Docklands (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/667,192

(22) Filed: Oct. 29, 2019

(65) Prior Publication Data

US 2020/0221259 A1 Jul. 9, 2020

Related U.S. Application Data

(63) Continuation of application No. 16/243,805, filed on Jan. 9, 2019.

(51) Int. Cl.
*H04W 4/029* (2018.01)
*H04W 4/90* (2018.01)
*H04W 4/80* (2018.01)

(52) U.S. Cl.
CPC .............. *H04W 4/029* (2018.02); *H04W 4/80* (2018.02); *H04W 4/90* (2018.02)

(58) Field of Classification Search
CPC ..... H04W 4/021; H04W 4/029; H04W 4/023; H04W 4/02; H04W 4/80; H04W 4/33; H04W 4/21; H04W 12/00503; H04L 67/18; H04L 67/22; G06Q 50/01; G04M 1/72572

See application file for complete search history.

(56) References Cited

PUBLICATIONS

List of all IBM related dockets. Appendix P. 2019.

*Primary Examiner* — Nam T Huynh
(74) *Attorney, Agent, or Firm* — Garg Law Firm, PLLC; Rakesh Garg; Joseph Petrokaitis

(57) ABSTRACT

At a first device, a location highlighting request is received. Responsive to the location highlighting request, a location highlight indicator is activated at the first device. It is determined that the location highlighting request includes a relay instruction. The location highlighting request is transmitted, responsive to the determining, from the first device to a cooperating device comprising a location highlight indicator and a location highlight cooperation capability.

20 Claims, 7 Drawing Sheets

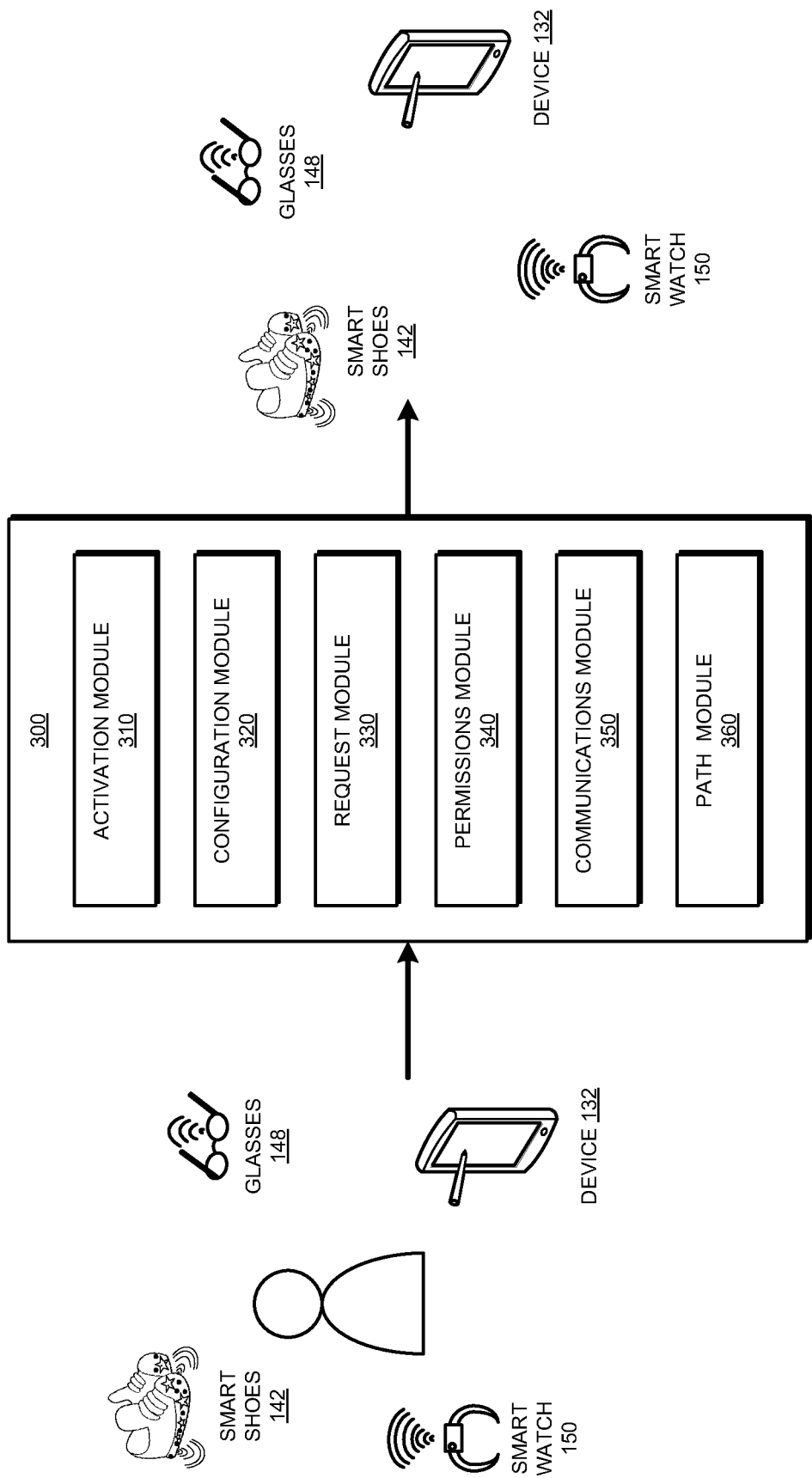

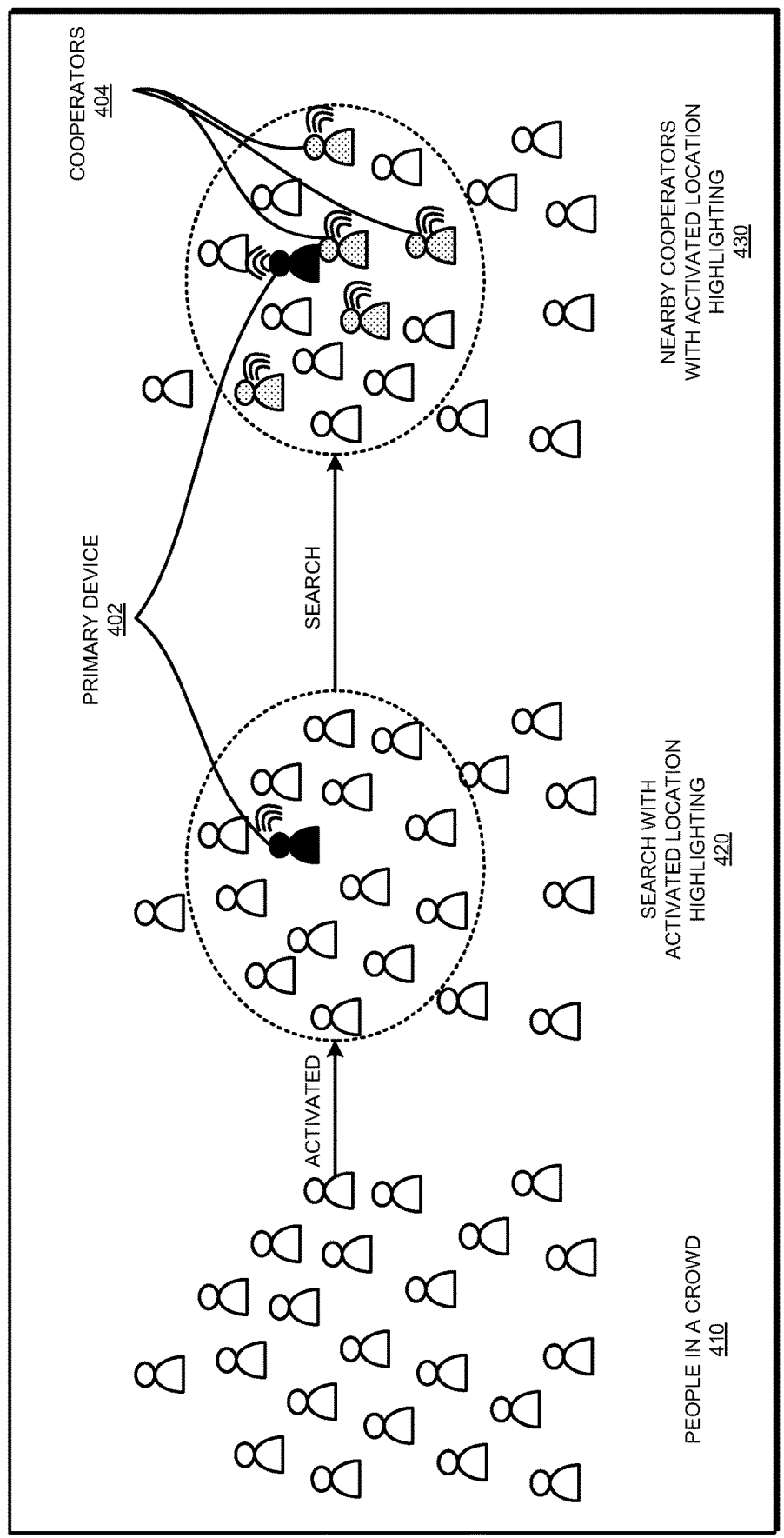

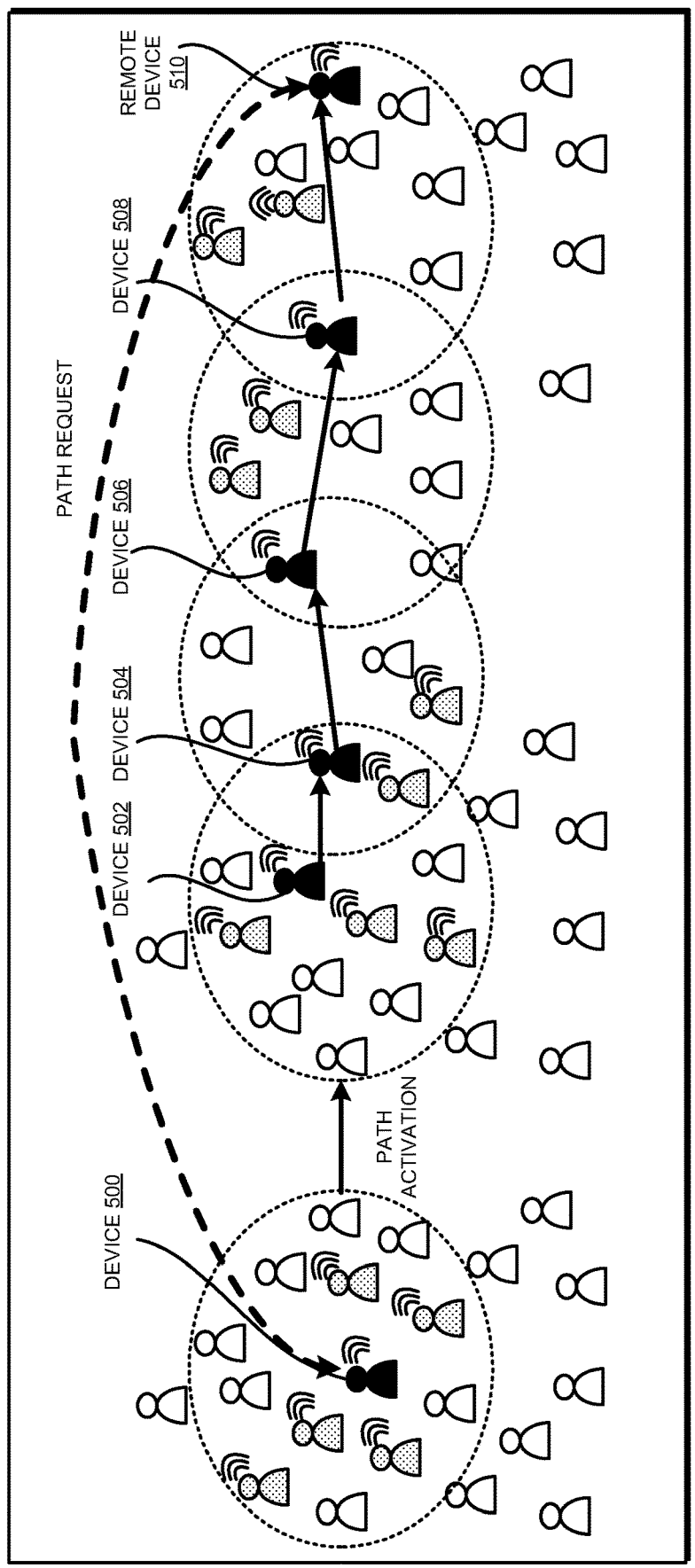

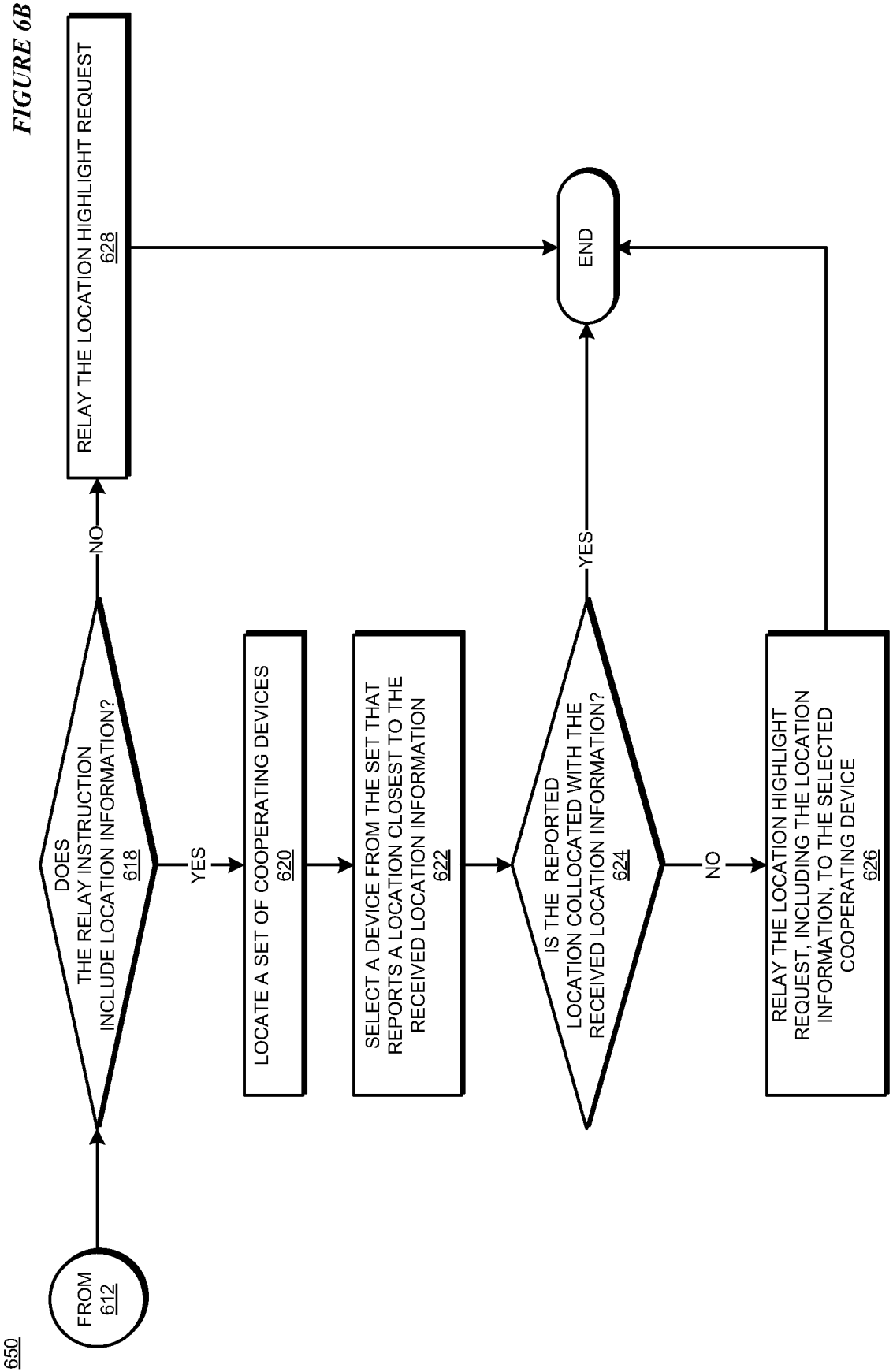

LOCATION DETERMINATION USING DEVICE COORDINATION

TECHNICAL FIELD

The present invention relates generally to a method, system, and computer program product for determining a person's location. More particularly, the present invention relates to a method, system, and computer program product for location determination using device coordination.

BACKGROUND

As it has become possible to manufacture electronic devices that are small enough to be worn or easily carried, but have enough processing power to be independently deployable, such devices have proliferated. As used herein, a smart wearable includes any electronic device that includes a processor, a memory, wireless communications to another device or to a network such as the Internet, the ability to make a light or a sound, and is light enough to be conveniently carried or worn as a garment or adornment. Such devices include conventional smartphones and small tablets, but also watches (capable of running applications, or with a fitness or location function), wristbands, earwear, glasses, rings, fingernail attachments, neckwear (such as necklaces, scarves, or ties), headwear, connected apparel such as shirts, belts, shoes, and socks, and more.

SUMMARY

The illustrative embodiments provide a method, system, and computer program product. An embodiment includes a method that receives, at a first device, a location highlighting request. An embodiment activates, responsive to the location highlighting request, a location highlight indicator at the first device. An embodiment determines that the location highlighting request includes a relay instruction. An embodiment transmits, responsive to the determining from the first device to a cooperating device comprising a location highlight indicator and a location highlight cooperation capability, the location highlighting request.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 3 depicts a block diagram of an example configuration for location determination using device coordination in accordance with an illustrative embodiment;

FIG. 4 depicts an example of location determination using device coordination in accordance with an illustrative embodiment;

FIG. 5 depicts another example of location determination using device coordination in accordance with an illustrative embodiment;

FIG. 6B depicts a continuation of a flowchart of an example process for location determination using device coordination in accordance with an illustrative embodiment.

DETAILED DESCRIPTION

Figure 1:
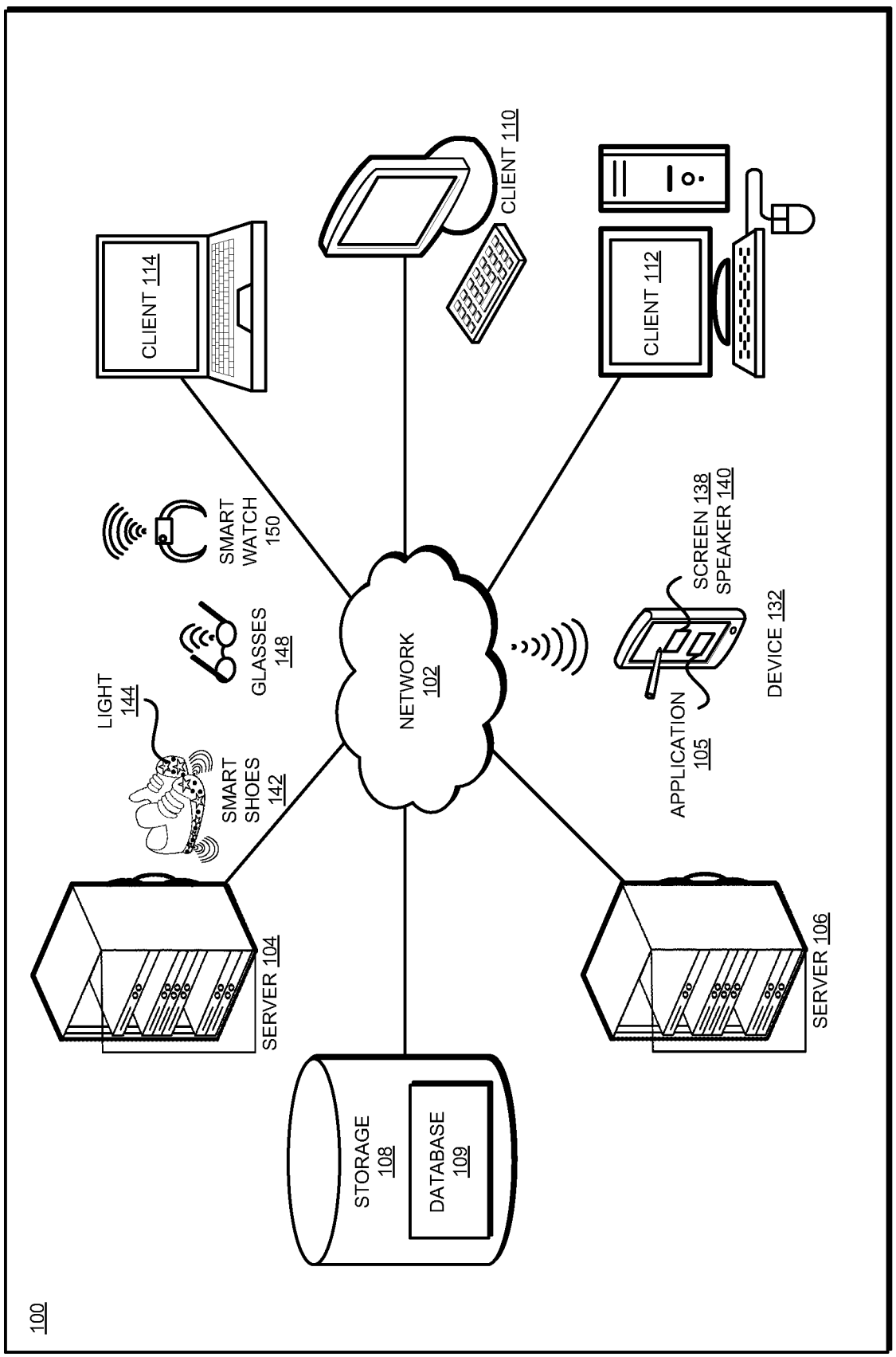
FIG. 1 depicts a block diagram of a network of data processing systems in which illustrative embodiments may be implemented.

The illustrative embodiments recognize that it is difficult to locate a person, animal, or object in a dark or crowded environment. For example, police or emergency medical personnel might need to locate someone requiring medical or police attention at a concert, people might be attempting to meet their friends in a dark movie theater or crowded open air festival, a delivery person might be delivering food to one small group on a crowded beach, a driver might be meeting someone at a crowded, busy airport, parents might be looking for a child after school or at a busy playground, or pet owners might be searching for a lost cat or a dog in a busy dog park. Geolocation—for example, using the Global Positioning System (GPS) capability of a user's smartphone or other location-enabled device—is insufficiently accurate for this purpose—only to within about a 5 meter radius under open sky, and less near buildings, bridges, and trees, and indoors or underground. People can describe their location, using landmarks and the like, but such descriptions are ineffective in the dark and in crowds. People may also be unable to describe their location if they are sick, injured, young children, or are simply too unfamiliar with the environment to describe useful reference points. Even given an accurate location description, people often move from the described location. As well, darkness and crowds interfere with the ability to see the person one is attempting to locate, even when both searcher and the person being searched for are within a few meters of each other.

The illustrative embodiments recognize that the presently available tools or solutions do not address these needs or provide adequate solutions for these needs. The illustrative embodiments used to describe the invention generally address and solve the above-described problems and other problems related to location determination using device coordination.

An embodiment can be implemented as a software application. The application implementing an embodiment can be configured as a modification of an existing smart wearable system, as a separate application that operates in conjunction with an existing smart wearable system, a standalone application, or some combination thereof.

Particularly, some illustrative embodiments provide a method by which smart wearables, both those of a searchee and those of others in close proximity to the searchee, can be used to aid in locating a person, animal, or object. As used herein, a searchee refers to the target of a location search.

An embodiment is configurable to perform location highlighting using light or sound in a variety of modes and frequencies. For example, an embodiment equipped with a light emitting diode (LED) light activates that light, or flashes that light in a pattern. An embodiment equipped with a display screen—for example, a smartphone—causes the display screen to display white light or another color of light. An embodiment equipped to make sounds makes a particular sound. An embodiment equipped for more than one signal allows a user to configure the particular location highlighting to be used—for example, a choice of colors or sounds, or a light or sound pattern.

When a searchee wants to highlight his or her location to others, the searchee activates the embodiment to perform location highlighting using light or sound. An embodiment allows such activation using any procedure suitable to the particular device in which an embodiment is implemented. For example, if a device has either physical buttons or activation areas that function like physical buttons, a searchee could activate location highlighting by pressing one or more buttons, or touching one or more activation areas, in a predefined sequence or pattern. If a device has one dedicated button or a dedicated set of buttons—for example, a panic button—a searchee could activate location highlighting simply by pressing that dedicated button. If a device has an application devoted to location highlighting—for example, a panic button application on a smartphone or smart watch—a searchee could activate location highlighting simply by starting that application or performing a procedure specific to that application. If a device is capable of summoning emergency personnel—for example, by telephoning the 911 emergency number in the United States, or by texting an appropriate emergency number—an embodiment detects such a call or message and activates location highlighting automatically.

An embodiment also includes provisions for activating location highlighting for the searchee. A searcher, such as a parent, pet owner, or emergency personnel can activate location highlighting for the searchee remotely, for example by using a different application available to the searcher. Another device—for example, a suitably-equipped heart pacemaker—can also activate location highlighting for the searchee remotely, using any suitable technique.

Once location highlighting for a searchee has been activated, an embodiment also requests location highlighting for the searchee, from other embodiments in proximity to the searchee. Such other embodiments, receiving such a request, are referred to herein as cooperators.

An embodiment allows any wearer of a smart wearable, or another person responsible for the smart wearable (in the case of children, animals, and objects), to grant permission to use the smart wearable either as a searchee or as a cooperator. An embodiment implements permissions for usage organized by role or reason. For example, permissions organized by role could be: usable by anyone, usable by emergency personnel, and usable by those in a "family" or "friends" group. Example permissions organized by reason could be: usable without any condition, usable under certain conditions, usable differently under different conditions according to searchee-designated priorities, and usable under default conditions or conditions specified by others, e.g., if an emergency alert (such as a weather alert) is in effect for the area.

A location highlighting request is configurable to include a reason code, for use when requesting cooperator usage. One embodiment is configured to allow an originator of a location highlight request, either searcher or searchee, to enter a reason code manually—for example, using a smartphone application or by pressing a predefined button sequence. Alternatively, an embodiment supplies a reason code automatically—for example, when used to summon emergency personnel to the searchee.

A location highlighting request is also configurable to include an identity indication for the searchee. Such an identity indication is configurable manually—for example, when a searcher or searchee uses a smartphone application to initiate a search, or when initially configuring a smart wearable for use. Alternatively, such an identity indication is configurable automatically—for example, by using account information already stored on a smartphone. An embodiment is configurable to allow reason codes and identity indications to be set during an initial setup of a smart wearable, or when location highlighting for a searchee is activated.

Thus, when location highlighting has been activated for a searchee, an embodiment of the searchee (referred to herein as the primary embodiment) searches for nearby cooperators that have granted permission for cooperator usage (referred to herein as secondary embodiments). As used herein, a nearby cooperator means one that is within range of Bluetooth or other short range wireless communications techniques, or one that is within a threshold radius. For example, Bluetooth Class 2 devices have a range of ten meters; an example threshold radius is one hundred meters. (Bluetooth is registered trademark of Bluetooth SIG, Inc. in the United States and other countries.) A primary embodiment performs the search using any suitable method. For example, if an embodiment is equipped with Bluetooth or another short range wireless communications capability, the primary embodiment attempts to communicate with any devices within range of that wireless communications technology, using a device discovery method suitable to that particular technology. If a primary embodiment is equipped with the ability to communicate wirelessly with a network such as the Internet, the primary embodiment uses the network to communicate with any other embodiments also capable of communicating on the network, using any suitable protocol to establish that one or more of the other embodiments are within the threshold radius.

Once a primary embodiment has found and established communication with one or more secondary embodiments, the primary embodiment sends a highlighting request, along with any reason codes or identity indications that have been set for the request, to the secondary embodiments. One or more receiving secondary embodiments determines whether the location request, along with any reason codes or identity indications, is encompassed by each secondary embodiment's configured permission levels for performing location services for others. If so, the secondary embodiment also performs location highlighting using light or sound. As a result, cooperators near the searchee act to amplify the searchee's location, making locating the searchee easier.

A primary embodiment sends a highlighting request to all secondary embodiments within range or within a threshold radius. Another primary embodiment sends a highlighting request to only a predefined number of secondary embodiments within range or within a threshold radius. Limiting a highlighting request to only a predefined number of recipients prevents too many activations at once, which may make locating a target person more difficult if an area is very crowded with those wearing embodiments.

A secondary embodiment is configurable to perform location highlighting using configured light or sound indications. In addition, a highlighting request is configurable to include a request for a specific light color or sound. If a received highlighting request includes such a specific request, only secondary embodiments capable of producing that specific light color or sound perform location highlighting, to avoid confusion if multiple location requests, emitted by multiple devices, are active at the same time.

If a cooperator receives a highlighting request including a pass-along request, the cooperator passes along the highlighting request to additional cooperators within communications range or a specified distance radius. Because the additional cooperators may not have been in range of the initial highlighting request, this passing along acts to extend the range of the initial highlighting request, producing an enlarged highlighted area for use in locating the searchee.

A pass-along request optionally includes a pass-along limit, a number denoting how many times cooperators should convey a pass-along request to other cooperators. As each cooperator receives such a pass-along request and conveys the request to nearby devices, the pass-along limit in the new request is decremented by one. Limiting the number of pass-alongs in this manner prevents the highlighted area from expanding infinitely and losing the searchee in too many additional highlights. An embodiment allows the initial pass-along limit to be configurable by a user, for example using an application to configure a particular highlighting request, or by using an application to configure all requests as part of an application setup phase. Another embodiment includes a hard-coded pass-along limit—for example, three, five, or ten times.

A highlighting request optionally includes a directional component, for use in implementing a location pathway mechanism. Such a pathway mechanism is useful in directing a searchee to an exit, a child to a waiting parent, or in other situations requiring a particular path through a crowd. To implement such a mechanism, a remote embodiment sends a location request, including location information for the device in which the remote embodiment is executing, to a searchee's embodiment. Here, both the remote embodiment and the searchee's embodiment communicate with each other over a network, and the remote embodiment, searchee's embodiment, and any cooperators are each capable of determining their own locations. As before, the searchee's embodiment activates the searchee embodiment's own location highlighting, as configured, and searches for nearby cooperators. Cooperators within range respond with their identifications and locations. The searchee embodiment selects the cooperator that is located closest to the remote embodiment and sends only that cooperator a highlighting request including location information for the remote embodiment. The selected cooperator then repeats the process, activating its own location highlighting, as configured, and searching for and selecting another cooperator located closest to the remote embodiment. The process repeats until a selected cooperator has the same location as the remote embodiment—at this time the path between searchee and remote embodiments is completely highlighted.

Importantly, cooperators perform location highlighting using light or sound. As well, cooperators do not relay their own locations to a searcher using means other than location highlighting using light or sound. Cooperators do relay their own locations to a searchee, to perform pathway illumination.

Once activated to begin location highlighting, both searchee and cooperator embodiments are deactivated in the same manner as they were activated. For example, if a user used a smartphone application to begin location highlighting, the user uses the same smartphone application to end location highlighting. If a primary embodiment sent a highlighting request to a secondary embodiment, the primary embodiment sends a deactivation request to the same secondary embodiment. As well, an embodiment has a timeout mechanism, either user-configurable or hard coded, to deactivate location highlighting after a period of time, to avoid excessively draining a device's battery and confusing others with no-longer-needed location requests. For example, one suitable timeout might be fifteen minutes.

The manner of location determination using device coordination described herein is unavailable in the presently available methods. A method of an embodiment described herein, when implemented to execute on a device or data processing system, comprises substantial advancement of the functionality of that device or data processing system in activating location highlighting and relaying location highlighting requests to other cooperating devices.

The illustrative embodiments are described with respect to certain types of smart wearables, relay instructions, counters, requests, transmissions, responses, sensors, measurements, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
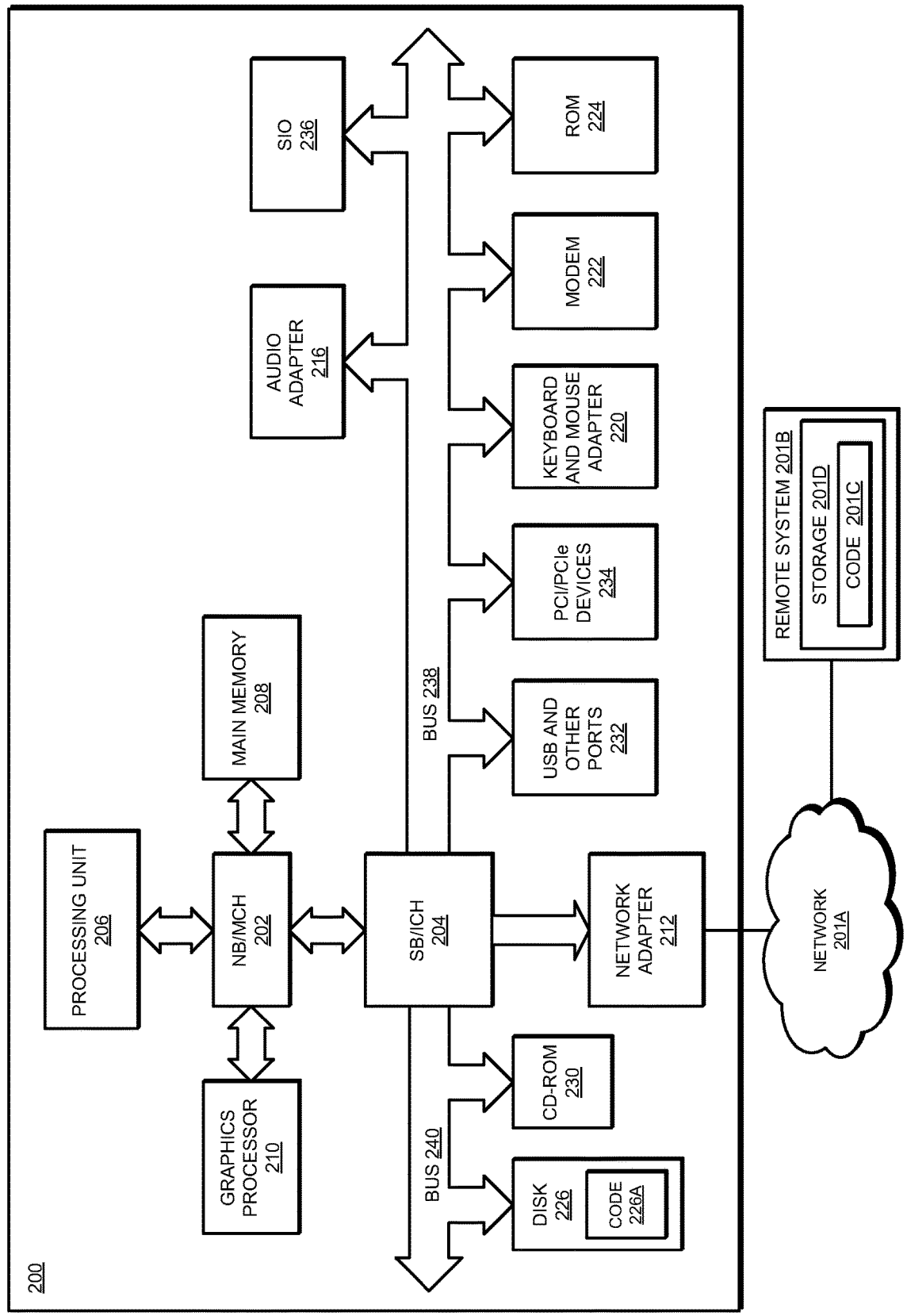
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein, such as a smart wearable. For example, device 132 can take the form of a smartphone, a tablet computer, a laptop computer, client 110 in a stationary or a portable form, a wearable computing device, or any other suitable device. Device 132 includes display screen 138 and speaker 140. Smart shoes 142 including lights 144, smart glasses 148, and smart watch 150 are also examples of a device described herein, such as a smart wearable. Any software application described as executing in another data processing system in FIG. 1 can be configured to execute in device 132, smart shoes 142, smart glasses 148, and smart watch 150 in a similar manner. Any data or information stored or produced in another data processing system in FIG. 1 can be configured to be stored or produced in device 132, smart shoes 142, smart glasses 148, and smart watch 150 in a similar manner.

Application 105 implements an embodiment described herein. Application 105 executes in any device that includes sufficient memory, processing power, and other capabilities, such as any of device 132, smart shoes 142, smart glasses 148, and smart watch 150. In addition, application 105 executing on one device, such as device 132, can communicate with another copy of application 105 executing on another device, such as smart shoes 142, smart glasses 148, or smart watch 150.

Servers 104 and 106, storage unit 108, and clients 110, 112, and 114, device 132, smart shoes 142, smart glasses 148, and smart watch 150 may couple to network 102 using wired connections, wireless communication protocols, or other suitable data connectivity. In addition, device 132, smart shoes 142, smart glasses 148, and smart watch 150 may communicate with each other using wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, or the operating system and applications of device 132, smart shoes 142, smart glasses 148, and smart watch 150 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. In another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

With reference to FIG. 3, this figure depicts a block diagram of an example configuration for location determination using device coordination in accordance with an illustrative embodiment. Application 300 is an example of application 105 in FIG. 1 and executes in any of device 132, smart shoes 142, smart glasses 148, and smart watch 150 in FIG. 1. Device 132, smart shoes 142, smart glasses 148, and smart watch 150 are the same as device 132, smart shoes 142, smart glasses 148, and smart watch 150 in FIG. 1.

Activation module 310 causes a device, for example device 132, to perform location highlighting or to stop performing location highlighting. Here, device 132 may be associated with a searchee or cooperator. If device 132 is associated with a searchee, activation module 310 receives an activation input or a deactivation input from a user, using any procedure suitable to device 132. For example, if device 132 has either physical buttons or activation areas that function like physical buttons, a user could activate location highlighting by pressing one or more buttons, or touching one or more activation areas, in a predefined sequence or pattern. If device 132 has one dedicated button or a dedicated set of buttons—for example, a panic button—a user could activate location highlighting simply by pressing that dedicated button. If device 132 has an application devoted to location highlighting—for example, a panic button application on a smartphone or smart watch—a user could activate location highlighting simply by starting that application or performing a procedure specific to that application. If device 132 is capable of summoning emergency personnel—for example, by telephoning the 911 emergency number in the United States, or by texting an appropriate emergency number—application 300 detects such a call or message and activation module 310 activates location highlighting automatically. Alternatively, a searcher, using an application running on a different device, communicates with application 300 to cause activation module 310 to activate location highlighting. If device 132 is acting as a cooperator, application 300 causes activation module 310 to activate location highlighting when appropriate.

Application 300 uses configuration module 320 to configure the format of location highlighting on a device. For example, if a device is equipped with an LED light, configuration module 320 is used to configure that light for location highlighting, or configure a specific pattern in which the light should flash. If a device is equipped with a display screen, configuration module 320 is used to configure the screen (perhaps in flashlight mode or with a particular color) for location highlighting. If a device is equipped to make sounds, configuration module 320 is used to configure the particular sounds this device will make when location highlighting. Configuration module 320 also configures different types of location highlighting—for example, a choice of colors or sounds, or a light or sound pattern. Such configurations can be hard-coded during manufacturing or changed by a user.

Request module 330 formulates requests to cooperators, also executing application 300, to perform location highlighting on behalf of a requester. Such requests include a request for location highlighting, as well as an optional reason code, an indication of the user's identity, or an location highlighting format. Request module 330 receives reason codes, identity indications, and location highlighting formats manually, from a user, or based on a predetermined configuration—for example, when application 300 is being used to summon emergency personnel, or when a particular activation format is received from another device. As well, application 300 allows reason codes and identity indications to be set during an initial device setup, or when a user activates location highlighting.

Permissions module 340 grants permission for the use of a device as a cooperator or as a searchee. Permissions can be organized by role or reason.

Communications module 350 communicates with nearby cooperating devices, for example other devices 132, also executing copies of application 300. To communicate directly with other cooperators, communications module 350 uses any configured communications technology, such as Bluetooth or another short range wireless communications capability. Alternatively, communications module 350 communicates with other cooperators over a network, for example using cellular data or Wi-Fi to communicate with other cooperators on the Internet.

Once communications module 350 has established communication with one or more cooperators, communications module 350 sends a highlighting request, as formulated by request module 330, to the cooperators. On each cooperator, permissions module 340 determines whether the received location request meets the cooperator's configured permission levels for performing location services for others. If a cooperator's permissions module 340 determines that configured permission levels are met, activation module 310 on the cooperator also performs location highlighting.

Request module 330 also formulates a request to a particular cooperator, also executing application 300, to perform location highlighting relative to the originating device. Such a request includes location information for the originating device.

At the receiving cooperator, if permissions module 340 receives a request including remote location information and determines that configured permission levels are met, activation module 310 performs location highlighting. As well, communications module 350 requests location information from the cooperators it is in communication with. Path module 360 uses this location information to determine which cooperator is located closest to the remote location described in the remote location information in the request. If there is no cooperator closer to the remote location than the current device, the current device is the remote requester, and application 300 does not generate further highlighting requests. Otherwise, request module 330 passes along the received request, including remote location information, to the selected cooperator.

With reference to FIG. 4, this figure depicts an example of location determination using device coordination in accordance with an illustrative embodiment. Primary device 402 and secondary devices 404 are each examples of device 132, smart shoes 142, smart glasses 148, and smart watch 150 in FIG. 1 and FIG. 3. FIG. 4 depicts an example of location determination using device coordination; each of device 132, smart shoes 142, smart glasses 148, and smart watch 150 executes a copy of application 300 in FIG. 3.

In particular, state 410 depicts users in a crowd. One or more users are wearing or carrying a device suitable for executing application 300. State 420 depicts the crowd, once one user has activated primary device 402 to perform location highlighting. State 430 also depicts the crowd, once primary device 402 has communicated with cooperators 404. Now cooperators 404 are also performing location highlighting.

With reference to FIG. 5, this figure depicts another example of location determination using device coordination in accordance with an illustrative embodiment. Devices 502, 504, 506, 508 and remote device 510 are each examples of device 132, smart shoes 142, smart glasses 148, and smart watch 150 in FIG. 1 and FIG. 3. FIG. 5 depicts an example of location determination using device coordination; each of devices 502, 504, 506, 508 and remote device 510 executes a copy of application 300 in FIG. 3.

Remote device 510 sends a location request, including location information for remote device 510, to device 502, the searchee, via a communications network. Device 502 activates its own location highlighting, as configured, and searches for nearby cooperators, using any suitable technique. Nearby cooperators respond, including their location information in the response. Device 502 determines which responding device is located closest to remote device 510 and sends a highlighting request to that device—here, device 504. Device 504 repeats the process, activating its own location highlighting, searching for nearby cooperators, determining that device 506 is located closest to remote device 510 and sends a highlighting request to device 506. Device 506 repeats the process, activating its own location highlighting, searching for nearby cooperators, determining that device 508 is located closest to remote device 510 and sends a highlighting request to device 508. Device 508 repeats the process, activating its own location highlighting, searching for nearby cooperator, determining that the closest nearby device to device 510 is in fact device 510, the termination of the highlighted path. Thus, a complete path between device 502, the searchee, and remote device 510 is highlighted.

Figure 6A:
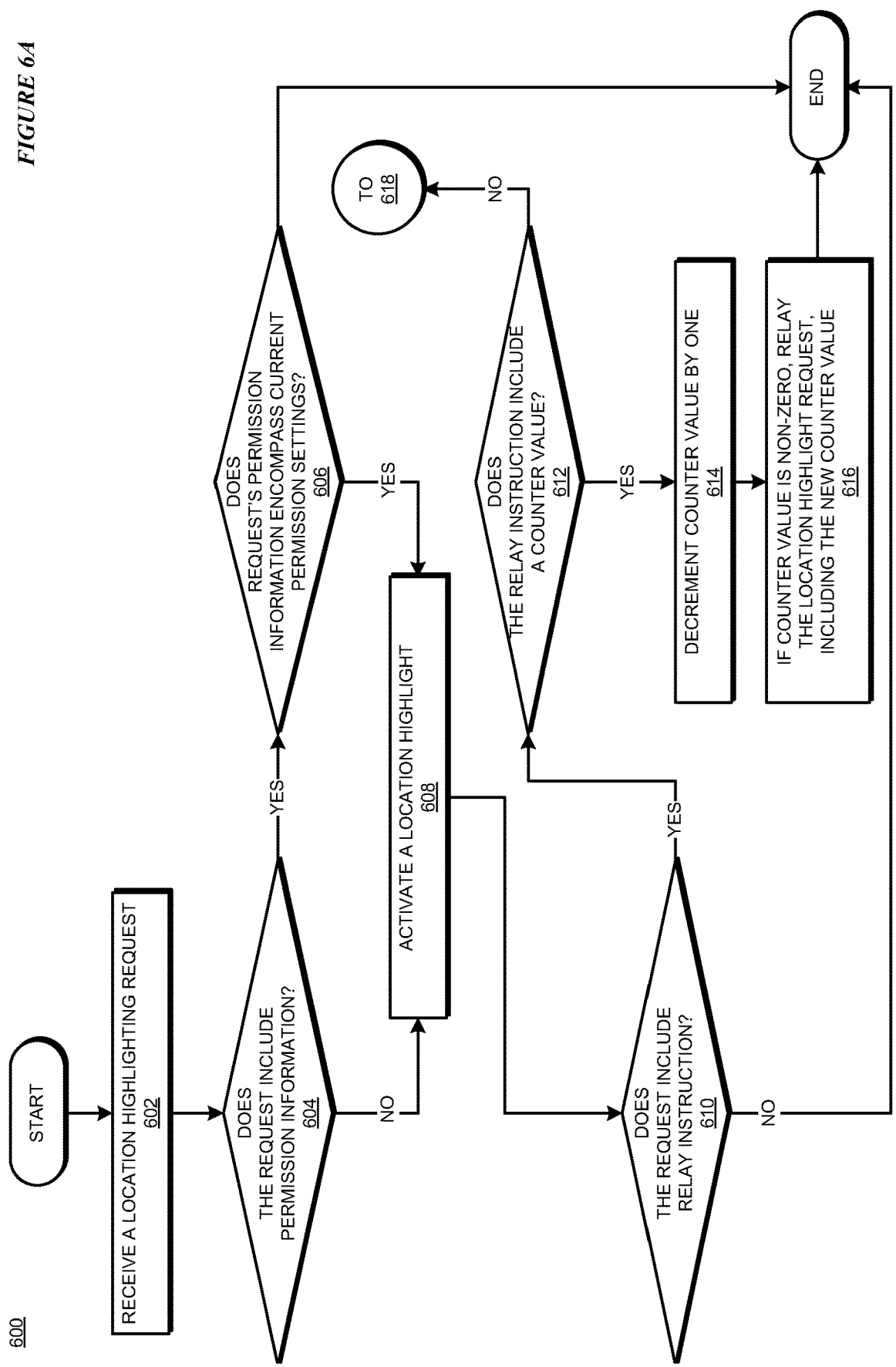
FIG. 6A depicts a portion of a flowchart of an example process for location determination using device coordination in accordance with an illustrative embodiment.

With reference to FIG. 6A, this figure depicts a portion of a flowchart of an example process for location determination using device coordination in accordance with an illustrative embodiment. FIG. 6B depicts a continuation of a flowchart of an example process for location determination using device coordination in accordance with an illustrative embodiment. Process 600, depicted in FIG. 6A, and process 650, depicted in FIG. 6B, can be implemented in application 300 in FIG. 3. Processes 600 and 650 can execute in a searchee's device or a cooperator's device.

In block 602, process 600 receives a location highlighting request. Such a request can originate on the device running process 600, or another device running another copy of process 600. In block 604, the application checks whether the request includes permission information. If yes ("YES" path of block 604), in block 606 the application checks whether the request's permission information encompasses current permission settings. If not ("NO" path of block 608), the application ends.

Otherwise ("NO" path of block 604 and "YES" path of block 606), in block 608 the application activates a location highlight. In block 610, the application checks whether the request includes a relay instruction. If not ("NO" path of block 610), the application ends. Otherwise ("YES" path of block 610), in block 612 the application checks whether the relay instruction includes a counter value. If yes ("YES" path of block 612), in block 614 the application decrements the counter value by one, and in block 616, if the counter value is now non-zero, the application relays the location highlight request including the new counter value. Then the application ends.

If in block 612 the application determines that the relay instruction does not includes a counter value ("NO" path of block 612), process 650, depicted in FIG. 6B, continues execution in block 618, in which the application checks whether the relay instruction includes location information. If yes ("YES" path of block 618), in block 620 the application locates a set of cooperating devices. In block 622 the application selects a device from the set that reports a location closes to the received location information. In block 624, the application checks whether the reported location is actually collocated with the received location. If so ("YES" path of block 624), the application ends. Otherwise ("NO" path of block 624), in block 626 the application relays the location highlight request including the location information, to the selected cooperating device. Then the application ends.

If in block 618 the application determines that the relay instruction does not include location information ("NO" path of block 618), in block 628 the application relays the location highlight request to any other cooperating devices within range or within a specified distance. Then the application ends.

Thus, a computer implemented method, system or apparatus, and computer program product are provided in the illustrative embodiments for location determination using device coordination and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method comprising:
   activating a location highlight indicator at a first device; and
   relaying, from the first device to a cooperating device comprising a location highlight indicator and a location highlight cooperation capability, a location highlighting request.

2. The method of claim 1, wherein the location highlight indicator comprises a visual indicator.

3. The method of claim 1, wherein the location highlight indicator comprises an audio indicator.

4. The method of claim 1, wherein the location highlight request comprises a location highlight specification specifying a type of location highlight indicator and the location highlight indicator is of the specified location highlight indicator type.

5. The method of claim 1, further comprising:
   determining that a relay instruction in the location highlighting request includes permission information; and
   transmitting, responsive to determining that the permission information is compatible with a permission setting of the first device, the location highlighting request.

6. The method of claim 1, further comprising:
   determining that a relay instruction in the location highlighting request includes a non-zero counter value;
   modifying, by decrementing the counter value by one, the location highlighting request; and
   transmitting, responsive to the determining, the modified location highlighting request.

7. The method of claim 1, further comprising:
   determining that a relay instruction in the location highlighting request includes location information of a remote device;
   broadcasting, from the first device responsive to the determining, a cooperation request;
   receiving, at the first device, a response to the cooperation request from the cooperating device, the response including location information of the cooperating device; and transmitting, responsive to the cooperating device reporting a location closer to the remote device than the first device, the location highlighting request.

8. A computer usable program product comprising one or more computer-readable storage devices, and program instructions stored on at least one of the one or more storage devices, the stored program instructions comprising:
program instructions to activate a location highlight indicator at the first device; and
program instructions to relay, from the first device to a cooperating device comprising a location highlight indicator and a location highlight cooperation capability, a location highlighting request.

9. The computer usable program product of claim 8, wherein the location highlight comprises a visual indicator.

10. The computer usable program product of claim 8, wherein the location highlight comprises an audio indicator.

11. The computer usable program product of claim 8, wherein the location highlight request comprises a location highlight specification specifying a type of location highlight indicator and the location highlight indicator is of the specified location highlight indicator type.

12. The computer usable program product of claim 8, further comprising:
program instructions to determine that a relay instruction in the location highlighting request includes permission information; and
program instructions to transmit, responsive to determining that the permission information is compatible with a permission setting of the first device, the location highlighting request.

13. The computer usable program product of claim 8, further comprising:
program instructions to determine that a relay instruction in the location highlighting request includes a non-zero counter value;
program instructions to modify, by decrementing the counter value by one, the location highlighting request; and
program instructions to transmit, responsive to the determining, the modified location highlighting request.

14. The computer usable program product of claim 8, further comprising:
program instructions to determine that a relay instruction in the location highlighting request includes location information of a remote device;
program instructions to broadcast, from the first device responsive to the determining, a cooperation request;
program instructions to receive, at the first device, a response to the cooperation request from the cooperating device, the response including location information of the cooperating device; and
program instructions to transmit, responsive to the cooperating device reporting a location closer to the remote device than the first device, the location highlighting request.

15. The computer usable program product of claim 8, wherein the computer usable code is stored in a computer readable storage device in a data processing system, and wherein the computer usable code is transferred over a network from a remote data processing system.

16. The computer usable program product of claim 8, wherein the computer usable code is stored in a computer readable storage device in a server data processing system, and wherein the computer usable code is downloaded over a network to a remote data processing system for use in a computer readable storage device associated with the remote data processing system.

17. A computer system comprising one or more processors, one or more computer-readable memories, and one or more computer-readable storage devices, and program instructions stored on at least one of the one or more storage devices for execution by at least one of the one or more processors via at least one of the one or more memories, the stored program instructions comprising:
program instructions to activate a location highlight indicator at the first device;
program instructions to relay, from the first device to a cooperating device comprising a location highlight indicator and a location highlight cooperation capability, a location highlighting request.

18. The system of claim 17, wherein the location highlight comprises a visual indicator.

19. The system of claim 17, wherein the location highlight comprises an audio indicator.

20. The system of claim 17, wherein the location highlight request comprises a location highlight specification specifying a type of location highlight indicator and the location highlight indicator is of the specified location highlight indicator type.

* * * * *